United States Patent [19]

Kidoh et al.

[11] 4,069,291
[45] Jan. 17, 1978

[54] DENSIFICATION OF PARTICULATE POROUS FLUORINATED RESINS

[75] Inventors: Kunizoh Kidoh; Hideki Wakamori; Genzo Asai; Kazuo Kusida, all of Iwaki, Japan

[73] Assignee: Kureha Kagaku Kogyo Kabushiki Kaisha, Japan

[21] Appl. No.: 697,735

[22] Filed: June 18, 1976

[30] Foreign Application Priority Data

June 20, 1975 Japan ................................. 50-74403

[51] Int. Cl.² ............................................. B29C 23/00
[52] U.S. Cl. ........................ 264/342 R; 260/29.6 PT; 260/29.6 F; 260/2.5 R; 528/480; 528/499
[58] Field of Search .............................. 264/117, 342; 260/29.6 PT, 2.5 R, 29.5 R

[56] References Cited

U.S. PATENT DOCUMENTS

| 2,609,539 | 9/1952 | Shearer | 264/342 R |
|---|---|---|---|
| 3,898,311 | 8/1975 | Mitchell et al. | 264/342 R |

OTHER PUBLICATIONS

"Crystallization of Polymers", Leo Mandelkern, McGraw-Hill Book Co., New York, 1964.

Primary Examiner—Robert F. White
Assistant Examiner—James R. Hall
Attorney, Agent, or Firm—Wenderoth, Lind & Ponack

[57] ABSTRACT

A suspension of a particulate porous fluorinated resin in an aqueous medium containing a powder of an inorganic suspension stabilizer is heated approximately at a melting temperature of the resin whereby the resin is densified, the degree of densification of the resin depending on the heating temperature.

8 Claims, No Drawings

DENSIFICATION OF PARTICULATE POROUS FLUORINATED RESINS

BACKGROUND OF THE INVENTION

1. Field of the Invention

This invention relates to densification of particles of a particulate porous fluorinated resin, by which the density of the resin is increased to a higher level.

2. Description of the Prior Art

In general fluorinated resins are poorly or slightly swellable by, or poorly or slightly soluble in, their starting monomer or monomers. Therefore, the particles of the particulate resin prepared by suspension polymerization or bulk polymerization are liable to be porous particles having a small bulk density, since the polymer particles undergo little volume shrinkage in the course of polymerization.

The polymers having a small bulk density possess defects in that their biting into processing machines upon their melt molding is inferior and extruding efficiency is low when they are used as molding materials, as well as in that their coating property is inferior and the coating film is thin so as to readily form pinholes when they are used as powder coating materials.

In order to remove these defects of the conventional porous particulate resins, some methods for densification of polymer particles have been employed. Examples of the conventional methods include;

a. additional incorporation of monomer in the course of polymerization reaction,
b. sintering of porous powder particles by means of hot gas stream, and
c. freeze-milling of melt-pelletized resins.

The method (a) comprises polymerizing additional monomers in the pores of porous resin particles which were obtained by suspension polymerization, as disclosed in Japanese Patent Publication Nos. 14465/1971 and 3588/1971. This method, however, may have defects in that upon closure of the pores of particles as the polymerization proceeds, absorption velocity of the monomer is lowered and a long period of time is thus required to complete the polymerization.

The method (b) results in the considerable aggregation of resin particles, and the yield of particulate resins free from aggregates is as low as 20 – 30% after the densification. Therefore, it is not industrially advantageous.

The method (c) also has many defects such as poor extruding propety of the resins which are to be pelletized, high costs in freeze-milling and sieving steps and the like, indeterminate shapes of the resulting high density particles, and very broad range of grain size distribution.

SUMMARY OF THE INVENTION

An object of the invention is to provide a method of increasing the density of particulate fluorinated resins, which are inherently porous, to a higher density level. Another object of the invention is to provide a process for preparing particulate fluorinated resins of a high resin density. The other objects of the invention will be made clear in the following descriptions.

The present invention is characterized in that a suspension of particles of a porous fluorinated resin in an aqueous medium containing an inorganic suspension stabilizer is heated at a temperature which approximates the melting temperature of the resin, whereby the density of the particles is increased.

In accordance with the present invention, densified particles of fluorinated resins are obtainable in a very good yield since little agglomeration of the particles during the heating takes place thanks to the inorganic suspension stabilizer. Further, the desired degree of high density can be given to the resin particles by adjusting the heating temperature of the suspension system.

DESCRIPTION OF THE PREFERRED EMBODIMENTS

Preparation of Suspension of Particulate Porous Fluorinated Resin

The expression "a particulate porous fluorinated resin" encompasses homopolymers and copolymers of a fluorinated ethylenically unsaturated monomer such as vinylidene fluoride, vinyl fluoride, chlorotrifluoroethylene, tetrafluoroethylene, or the like. The copolymers are each composed of at least one of these fluorinated monomers in a major quantity. Polyvinylidene fluoride, polyvinyl fluoride, polychlorotrifluoroethylene, and copolymers of vinylidene fluoride with chlorotrifluoroethylene are preferable. The particulate porous fluorinated resin can be prepared by means of a suspension polymerization process, a bulk polymerization process or the like, and can be employed in a slurry state just after suspension polymerization, a wet state after removing water from the polymerization system, a re-slurried state prepared by using the dry resin powders and a surfactant, or the like. The particle size of the particulate fluorinated porous resin is substantially within a range of about 5 – 1000μ and preferably about 10 – 500 μ.

The inorganic suspension stabilizer to be employed for preventing the resin particles from aggregating include those conventionally used as a suspension stabilizer in aqueous suspension polymerization of ethylenically unsaturated monomers, which are inorganic powder materials insoluble or slightly soluble in water, such as phosphates, for example orthophosphates, pyrophosphates or tripolyphosphates of a metal such as Ca, Mg, Ba, Sr, Zn, or Al, calcium carbonate, calcium hydroxy apatite, aluminium hydroxide, barium sulphate, magnesia, kaoline, talc, titanium white, silicic anhydride or clays. The average grain size of these agents is generally in the range of about 0.005 – 1.0 μ and preferably about 0.05 – 0.5 μ.

The quantity of the inorganic suspension stabilizer is about 0.1–10.0% by weight and preferably about 0.5 – 5.0% by weight of the particulate fluorinated resin in the suspension.

A small amount of a surfactant can advantageously be used so as to improve wettability of the particulate fluorinated resin to be dispersed in the aqueous medium as well as to prevent the fine powder of the inorganic suspension stabilizer from aggregating, whereby surfaces of the particulate fluorinated resin are completely covered with the suspension stabilizer. The surfactants to be employed for this purpose may be either anionic surfactants, cationic surfactants, nonionic surfactants, or amphoteric or zwitter-ionic surfactants. These surfactants may be exemplified by anionic surfactants such as K-oleate, Na-alkylbenzene sulfonate and Na-alkyl sulfonate, cationic surfactants such as dimethyl stearyl benzyl ammonium bromide, and nonionic surfactants such as alkyl ether of polyoxy-ethylene phosphate.

The ratio of the particulate fluorinated resin to water in the aqueous medium is generally from about 1 : 1 to about 1 : 10 by weight. From the viewpoints of economy and prevention of aggregation, the ratio of from about 1 : 2 to about 1 : 5 is generally desirable.

The suspension of the particulate porous fluorinated resin in an aqueous medium containing a suspension stabilizer is prepared in any convenient way. One way is to add to an aqueous medium a dry particulate fluorinated resin and a suspension stabilizer. Another way is to utilize a product of suspension polymerization in an aqueous medium of a fluorinated monomer in the presence of an inorganic suspension stabilizer.

Densification Treatment

The aqueous suspension of the particulate fluorinated porous resin thus prepared is then subjected to densification treatment wherein the suspension is heated at a temperature near the melting point of the resin, preferably in a pressure vessel such as an autoclave. The heating may be conducted by conventional external heating or by injecting steam directly into the suspension in the vessel.

The heating temperature can suitably be determined based on both the melting point of the particulate fluorinated resin and the desired degree of the densification. The effective temperature range is not lower than a temperature at which an absorption of heat due to endothermic fusion of the fluorinated resin is detected by a differential scanning calorimeter (DSC). When the temperature is higher than the melting point of the resin, the treatment is accompanied with disadvantages in that the particles are apt to be aggregated and a larger amount of suspension stabilizer is consequently needed. Therefore, it is not desirable that the heating temperature be about 10° C or more in excess of the maximum temperature at which the heat absorption takes place on DSC. When resins having a higher melting temperature, such as polymers of polyvinyl fluoride which have a melting point lying close to a decomposition temperature, are used as the fluorinated resin the temperature of heat treatment can be lowered by concomitantly employing a latent solvent or a plasticizer, e.g., an ester such as dioctyl phthalate polyester, a ketone such as methylisobutyl ketone, dimethylformamide, dimethylsufoxide, etc. The range of the temperature at which absorption of fusion heat is exhibited by means of DSC becomes broader by the concomitant use of the latent solvent or plasticizer. The range of the temperature may be considered to be the range of the melting point of the resin composition.

During the heat treatment, it is not necessary to maintain the temperature of the resin at a desired level for a long time or it is rather desirable to stop heating or cool the resin quickly once the resin has reached the desired level of temperature. If it is desired that the temperature be maintained at a desired level for a certain duration, the duration may desirably be within 1 hour.

The particulate fluorinated resin which now has increased density may be subjected to after treatment wherein the suspension stabilizer adhering to the particulate resin is removed if such is necessary or desirable for better cohesion of the particles upon sintering, for example. Acids may be used for removing the suspension stabilizer such as a phosphate or a carbonate, which is soluble in acid, and, in this case, the suspension stabilizer adhering to the surfaces of particulate resins can readily be removed by adjusting the pH of the suspension after the densification treatment to 2.0 or lower by the addition of an acid thereto.

The particulate fluorinated resins which have been subjected to a densification treatment show a very large apparent or bulk density as high as about 60 – 90 g/dl or higher, whereas the density before the treatment is lower than 50 g/dl or about 30 – 40 g/dl. The treated resin particles are transparent due to shrinkage and are completely spherical in shape.

Accordingly, the particulate fluorinated resins which have undergone densification treatment of the present invention are markedly improved in processing properties such as flowing from a hopper and in biting into an extruder and the like. Thus, the treated particulate resins have improved extruding property. On the other hand, the particulate resins have improved sintering property and are thus useful as materials for various applications such as nibs of marking-ink pens and sintered electrolytic membranes. Furthemore, they are employed to prepare excellent powder coating materials, whereby coatings of suitable thickness can be formed without pinholes.

The present invention will be further explained by the following working examples. It is to be understood that the invention should not be limited by these examples. All percentages (%) in the examples are based on weight unless otherwise specified.

EXAMPLE 1

A 10 liter (inside volume) pressure-proof stainless steel autoclave equipped with an agitator and a cooling jacket is charged with 1,000 g. of polyvinylidene fluoride (prepared by suspension polymerization and having a particle size distribution and bulk density as shown under "Original" in Table 1) having an average degree of polymerization $\bar{p} = 1,000$, 4,000 g of water, 10 g. of 15% potassium oleate, and 300 g. of 10% calcium hydroxyapatite (trade name; "Supertite-10", supplied by Nippon Chemical Industry Co., Ltd., Japan), followed by dispersing the mixture and sealing the autoclave. Steam of 8.5 kg/cm$^2$ gauge is blown into the autoclave to raise the temperature of the suspension therein to a predetermined temperature. Then, cooling water is passed into the jacket to lower the temperature in the autoclave to 60° C. The resulting suspension is taken out and treated with hydrochloric acid to dissolve calcium hydroxyapatite therein followed by removing water, washing and drying. The bulk density of the particles thus obtained are shown in Table 1, in which it is noted that the bulk density thereof can optionally be controlled by means of the temperatures of the heat treatment. Furthermore, formation of large grains and formation of massive products due to aggregation of the particles are not at all observed.

Table 1

| Temperature of heat treatment<br>Distribution of Particle size | Original | 159° C | 163° C | 167° C | 171° C |
|---|---|---|---|---|---|
| 42 mesh (%) | — | 0.1 | — | — | — |
| 60 | 0.3 | 0.1 | 0.2 | 0.1 | — |
| 80 | 5.8 | 0.5 | 0.2 | 0.3 | — |
| 100 | 32.7 | 10.9 | 4.7 | 3.1 | 3.0 |
| 150 | 28.8 | 30.2 | 28.0 | 21.6 | 29.3 |
| 200 | 25.0 | 42.7 | 46.6 | 40.1 | 45.5 |
| 250 | 3.8 | 5.9 | 6.5 | 21.6 | 7.1 |
| 325 | 1.9 | 6.7 | 10.3 | 7.7 | 10.1 |

Table 1-continued

| Temperature of heat treatment Distribution of Particle size | Original | 159° C | 163° C | 167° C | 171° C |
|---|---|---|---|---|---|
| 325 pass | 1.5 | 3.0 | 3.5 | 5.6 | 5.1 |
| Bulk density g/dl | 32.5 | 61.8 | 75.6 | 79.6 | 82.0 |

EXAMPLE 2

A mixture is prepared by mixing 1,000 g. of the same polyvinylidene fluoride as employed in Example 1, 4,000 g. of water, 10 g. of 15% potassium oleate and 100 g. of aluminium sulfate [$Al_2(SO_4)_3.16 - 18 H_2O$]. The pH of the resulting suspension is adjusted to 6.0 by adding 2% sodium hydroxide thereto. The suspension is then placed in an autoclave and heated to 171° C, followed by removal and treatment in the same way as in Example 1. The particulate resin thus obtained has a bulk density of 82.5 g/dl. All the particles are transparent and retain their original spherical shape. Formation of large grains and massive products due to aggregation of the particles is scarcely observed.

EXAMPLE 3

In this example, in place of the polyvinylidene fluoride used in Example 1, is employed a suspension-polymerized copolymer of vinylidene fluoride-chlorotrifluoroethylene, of which the copolymeric composition is 95:5, the average grain size is 150 $\mu$ and the bulk density is 33 g/dl.

An autoclave is charged with 1,000 g. of the copolymer, 4,000 g. of water, 10g. of 15% potassium oleate and 300 g. of "Supertite-10" as employed in Example 1. The mixture is heated to 160° C, followed by removal and treatment in the same way as in Example 1. The particulate resin thus obtained has a bulk density of 79 g/dl. The particles have their original spherical shape and all the particles are transparent. Formation of large grains and massive products due to aggregation of the particles is scarcely observed.

What is claimed is:

1. A process for increasing the bulk density of a porous particulate fluorinated resin, which comprises preparing a suspension of a particulate porous fluorinated resin in an aqueous medium containing, as a suspension stabilizer, a powder of an inorganic material which is insoluble or slightly soluble in water, and heating the suspension at approximately the melting temperature of the resin, thereby reducing the volume of the particulate fluorinated resin.

2. The process as set forth in claim 1, in which the fluorinated resin is selected from the group consisting of homopolymers and copolymers of a fluorinated ethylenically unsaturated monomer, the fluorinated ethylenically unsaturated monomer constituting a major portion of the copolymer.

3. The process as set forth in claim 2, in which the fluorinated ethylenically unsaturated monomer is selected from the group consisting of vinylidene fluoride, vinyl fluoride and chlorotrifluoroethylene.

4. The process as set forth in claim 1, in which the inorganic mateial is selected from the group consisting of ortho-, pyro- and tripoly-phosphates of Ca, Mg, Ba, Zn and Al, calcium carbonate, barium sulphate, titanium white and calcium hydroxy apatite.

5. The process as set forth in claim 1, in which the suspension is heated at a temperature ranging from the temperature at which endothermic fusion of the fluorinated resin occurs to the melting temperature of the fluorinated resin.

6. The process as set forth in claim 1, in which the bulk density of the particulate porous fluorinated resin to be processed is lower than 50 g/dl.

7. The process as set forth in claim 1, in which the suspension further contains a surface active agent to improve wettability of the particulate fluorinated resin.

8. The process as set forth in claim 1, in which the suspension further contains a member selected from the group consisting of a latent solvent for the resin and a plasticizer for the resin.

* * * * *